United States Patent
Sugiyama et al.

(10) Patent No.: US 8,125,552 B2
(45) Date of Patent: Feb. 28, 2012

(54) SOLID-STATE IMAGE PICKUP DEVICE WITH ADJUSTABLE IMAGE READOUT AREA

(75) Inventors: Yukinobu Sugiyama, Hamamatsu (JP); Seiichiro Mizuno, Hamamatsu (JP); Haruyoshi Toyoda, Hamamatsu (JP); Munenori Takumi, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 808 days.

(21) Appl. No.: 11/883,390

(22) PCT Filed: Feb. 2, 2006

(86) PCT No.: PCT/JP2006/301778
§ 371 (c)(1),
(2), (4) Date: May 13, 2008

(87) PCT Pub. No.: WO2006/082895
PCT Pub. Date: Aug. 10, 2006

(65) Prior Publication Data
US 2010/0118171 A1    May 13, 2010

(30) Foreign Application Priority Data
Feb. 3, 2005    (JP) .............................. P2005-027978

(51) Int. Cl.
*H04N 3/14* (2006.01)
*H04N 5/335* (2011.01)

(52) U.S. Cl. ................. 348/302; 348/222.1; 348/294
(58) Field of Classification Search .............. 348/208.1, 348/222.294, 308
See application file for complete search history.

(56) References Cited

U.S. PATENT DOCUMENTS

| | | | |
|---|---|---|---|
| 6,181,375 B1 | 1/2001 | Mitsui et al. | |
| 6,933,973 B1 | 8/2005 | Sako | |
| 7,129,978 B1* | 10/2006 | Brehmer et al. | 348/308 |
| 2002/0154347 A1* | 10/2002 | Funakoshi et al. | 358/513 |
| 2005/0041124 A1 | 2/2005 | Sugiyama et al. | |
| 2005/0062867 A1* | 3/2005 | Mabuchi | 348/308 |
| 2005/0174452 A1* | 8/2005 | Blerkom et al. | 348/294 |
| 2006/0113458 A1* | 6/2006 | Yang et al. | 250/208.1 |
| 2006/0243883 A1* | 11/2006 | Yahazu et al. | 250/208.1 |
| 2006/0284999 A1* | 12/2006 | Muramatsu et al. | 348/308 |

FOREIGN PATENT DOCUMENTS

EP    0 527 004 A1    2/1993
(Continued)

*Primary Examiner* — Gevell Selby
(74) *Attorney, Agent, or Firm* — Drinker Biddle & Reath LLP

(57) ABSTRACT

There is provided a solid-state imaging device in which images can be read at high speed. Since an n-th processing circuit (e.g. PU1) can be connected to n-th pixel columns (N1) in respective imaging blocks B1, B2, and B3 via switches Q (1), Q (4), and Q (7), signals from the adjacent pixel columns (N2) are to be processed separately by another processing circuit (PU2) even when a partial readout area R may be small. In addition, an image data arithmetic section 10 specifies the partial readout area R restrictively, which allows for higher speed imaging.

2 Claims, 10 Drawing Sheets

FOREIGN PATENT DOCUMENTS

| | | |
|---|---|---|
| EP | 1 460 839 A1 | 9/2004 |
| JP | 5-30437 | 2/1993 |
| JP | 05-236364 | 9/1993 |
| JP | 3251042 | 9/1993 |
| JP | 6-121237 | 4/1994 |
| JP | 08-251492 | 9/1996 |
| JP | 2000-253315 | 9/2000 |
| JP | 2002-232291 | 8/2002 |
| JP | 2003-189181 | 7/2003 |
| JP | 2003-319262 | 11/2003 |
| WO | WO 03/055201 A1 | 7/2003 |

* cited by examiner

SOLID-STATE IMAGE PICKUP DEVICE WITH ADJUSTABLE IMAGE READOUT AREA

TECHNICAL FIELD

The present invention relates to solid-state imaging devices with an adjustable image readout area.

BACKGROUND ART

A conventional solid-state imaging device is described in the following Patent Document 1. In this solid-state imaging device, the image readout area can be switched to one-half or one-third of the entire area.
Patent Document 1: Japanese Patent No. 3251042

DISCLOSURE OF THE INVENTION

Problems to be Solved by the Invention

However, the conventional solid-state imaging device suffers from a problem that processing loads on multiple processing circuits provided at the subsequent stage of the solid-state imaging device differ from each other depending on the readout area. For example, there occurs a phenomenon that a small image on the right side of the imaging area is processed by only the processing circuits corresponding to this right-side area, while the other processing circuits do not operate. That is, in the conventional solid-state imaging device, since the processing speed of each processing circuit is limited by the processing load thereon, high speed image readout cannot be achieved.

In tracking control of a missile or a vehicle traveling in front, it is necessary to read and recognize images of the target at high speed, but the readout speed is not sufficient in the conventional solid-state imaging device.

The present invention has been made in consideration of the above-described problems, and an object thereof is to provide a solid-state imaging device in which images can be read at higher speed than in the conventional device.

Means for Solving the Problems

A solid-state imaging device according to the present invention having an imaging area with K imaging blocks arranged therein, each imaging block including N pixel columns arranged adjacently, the device comprising: an image data arithmetic section for specifying a partial readout area in accordance with an input digital video signal; a row selecting circuit for selecting a pixel row corresponding to the partial readout area; a column selecting circuit for selecting a pixel column corresponding to the partial readout area; a timing generating circuit for generating a control signal for selection by the row and column selecting circuits based on an output from the image data arithmetic section; and N processing circuits connected to the respective N pixel columns via switches that are turned on through the selection by the column selecting circuit, wherein the n-th processing circuit can be connected to the n-th pixel columns in the respective imaging blocks via the switches, and the N processing circuits are adapted to generate the digital video signal from a signal for each pixel column selected by the row and column selecting circuits.

In accordance with the solid-state imaging device, since the n-th processing circuit can be connected to the n-th pixel columns in the respective imaging blocks via the switches, signals from the adjacent pixel columns are to be processed separately by another processing circuit even when the partial readout area may be small. In addition, the image data arithmetic section specifies the partial readout area restrictively, which allows for higher speed imaging.

The solid-state imaging device according to the present invention further includes a plurality of holding circuits connected to the respective pixel columns, in which the switches are adapted to connect charges accumulated in the holding circuits for the respective pixel columns to the processing circuits corresponding to the respective pixel columns synchronously with the control signal input from the timing generating circuit to the column selecting circuit.

The signals for each pixel row are once accumulated in the respective holding circuits, and when the switches are turned on by the control signal, charges accumulated for each pixel row can be transferred to the processing circuits corresponding to the respective pixel columns.

It is noted that the processing circuits each preferably have an amplifier and an analog-to-digital converter connected to each other. In this case, analog pixel signals are converted into digital video signals.

Effect of the Invention

In accordance with the solid-state imaging device according to the present invention, high speed image readout can be achieved.

DESCRIPTION OF SYMBOLS

Figure 1:
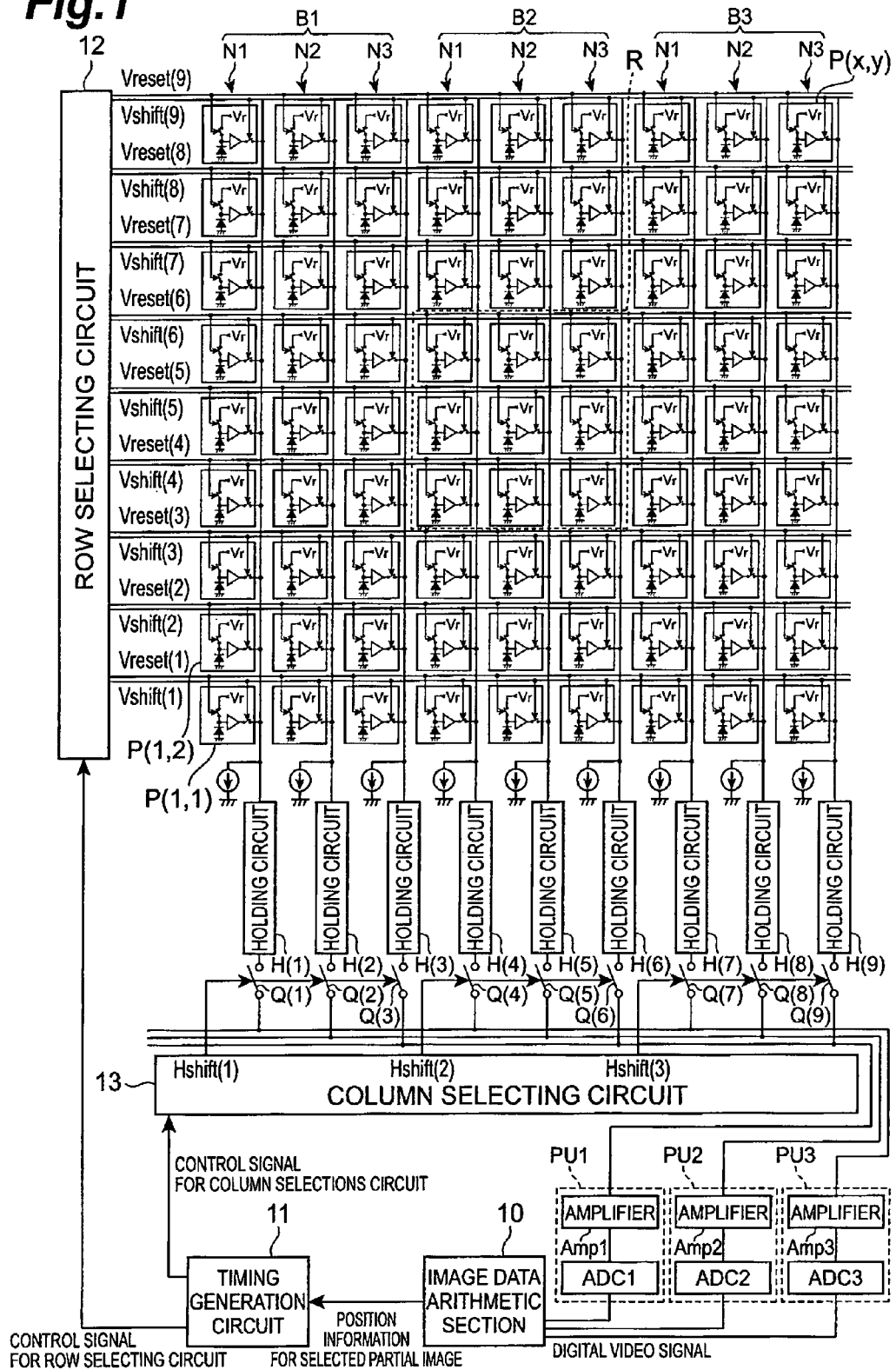
FIG. 1 is a block diagram of a solid-state imaging device according to an embodiment.

ADC1, ADC2, and ADC3: Analog-to-digital converters
10: Image data arithmetic section
11: Timing generating circuit
12: Row selecting circuit
13: Column selecting circuit
AMP: Amplifier
B1, B2, and B3: Imaging blocks
H: Holding circuit
PD: Photodiode
PU1, PU2, and PU3: Processing circuits

BEST MODE FOR CARRYING OUT THE INVENTION

A solid-state imaging device according to an embodiment will hereinafter be described. It is noted that identical components are designated with the same reference numerals to omit overlapping description.

FIG. 1 is a circuit diagram of a solid-state imaging device according to an embodiment.

The solid-state imaging device includes an imaging element and a control circuit.

Figure 2:
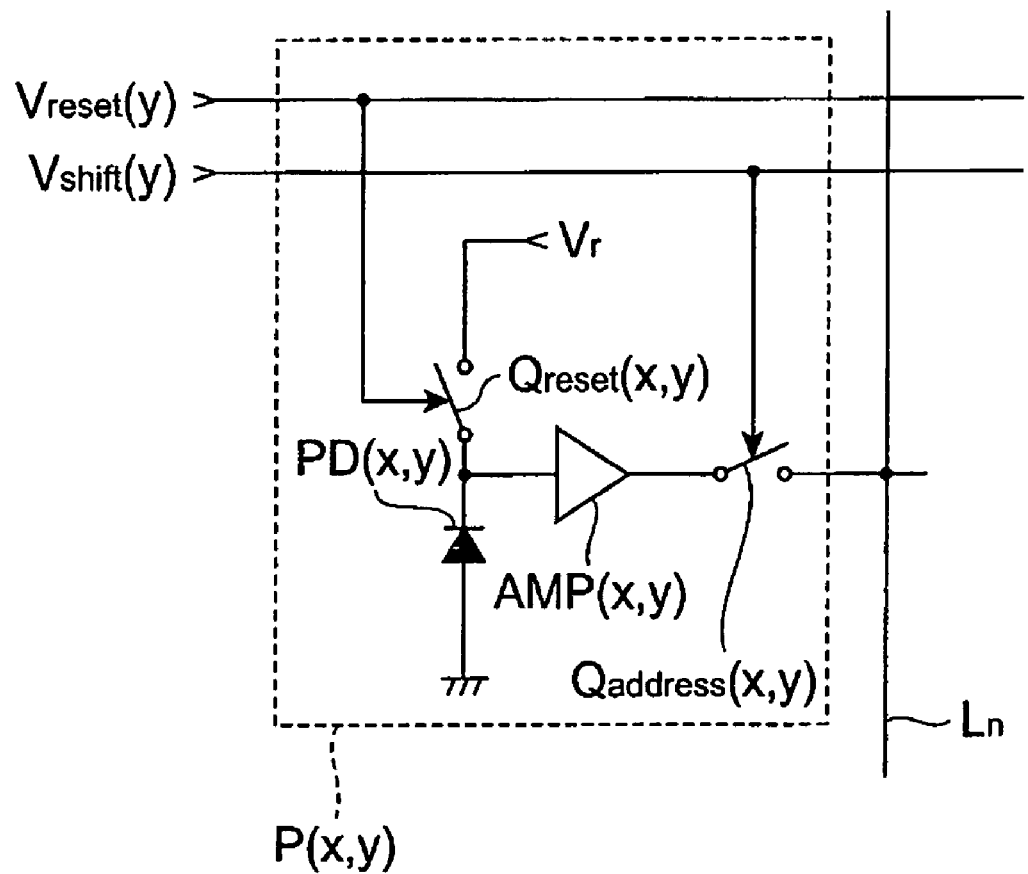
FIG. 2 is a detailed configuration diagram of each pixel P (x, y) constituting each pixel column.

The imaging element has an imaging area with K imaging blocks B1, B2, and B3 (K=3 in this example) arranged therein, each imaging block including N pixel columns (N1, N2, and N3) arranged adjacently. Each imaging block is identified by "k" from the left. It is noted that FIG. 2 shows a detailed configuration of each pixel P (x, y) constituting each pixel column.

The pixel P (x, y) includes a photodiode PD (x, y), a reset switch $Q_{reset}$ (x, y) connected between the cathode of the photodiode PD (x, y) and a reset potential $V_r$, an amplifier AMP (x, y) with the cathode of the photodiode PD (x, y) connected to the input terminal thereof, and an address switch $Q_{address}$ (x, y) connected between the amplifier AMP (x, y) and a video line $L_n$. It is noted that the address of each coordinate point (x, y) is specified by numbers from 1 to 9.

When a high-level shift signal (vertical) $V_{shift}$ (y) is input to the address switch $Q_{address}$ (x, y), a pixel signal amplified in the amplifier AMP (x, y) can be transferred to the video line $L_n$. Charges accumulated in accordance with the amount of light incident to the photodiode PD (x, y) are amplified in the amplifier AMP (x, y) and output to the video line $L_n$ as a voltage value. Then, when a high-level reset signal (vertical) $V_{reset}$ (y) is input to turn the reset switch $Q_{reset}$ (x, y) on, charges accumulated in the photodiode PD (x, y) are reset.

In this example, there are nine pixels P (x, y) along the row direction (x) and nine pixels P (x, y) along the column direction (y) arranged at two-dimensional locations defined by the address (x, y). Also in this example, a partial readout area R is set at the center of the imaging area, and signals from pixels P (x, y) within the partial readout area R are to be read.

The partial readout area R is specified by an image data arithmetic section 10. The image data arithmetic section 10 specifies the partial readout area R in accordance with an input digital video signal. That is, the address of a pixel P (x, y) having a brightness of a predetermined level or more in one image frame in a digital video signal is stored, for example. In the case of imaging a target such as a missile, if the imaging element is made of silicon, the infrared image of the target spreads peripherally in a continuous manner from the center of gravity of the object image as a starting point for maximum brightness, and the brightness is less than a predetermined level in the peripheral portion.

That is, the partial readout area R is selected as a rectangular area including the point of maximum brightness and points with a brightness within a predetermined level ±Δ. In the case of a moving target, the in-frame differential vector (x2−x1, y2−y1) between the center of gravity (x1, y1) of the object image in the last frame and the center of gravity (x2, y2) of the object image in the current frame is calculated, and the center of gravity (x3, y3) of the object image in the next frame is estimated as a position obtained by adding the vector to the center of gravity (x2, y2) of the object image in the current frame. Then, a rectangular area having this center of gravity is set as a new partial readout area R.

The image data arithmetic section 10 receives digital video signals, which can be obtained by inputting signals for each pixel column (three columns) from each imaging block B1 (B2, B3) to the processing circuits PU1, PU2, and PU3. Each processing circuit PU1 (PU2, PU3) has an amplifier AMP1 (AMP2, AMP3) and an analog-to-digital converter ADC1 (ADC2, ADC3) connected to each other. Analog pixel signals output from the pixel columns are converted into digital video signals through the processing circuits PU1, PU2, and PU3.

Position information of selected partial image (x=4 to 6, y=4 to 6) for specifying the partial readout area R is input to a timing generating circuit 11. The solid-state imaging device also includes a row selecting circuit 12 for selecting a pixel row corresponding to the partial readout area R and a column selecting circuit 13 for selecting a pixel column corresponding to the partial readout area R. The timing generating circuit 11 is adapted to generate a control signal for a row selecting circuit and a control signal for a column selecting circuit based on the input position information of selected partial image.

In other words, the row selecting circuit control signal allows the row selecting circuit 12 to select an image so that signals are read from pixel rows of y=4 to 6, while the column selecting circuit control signal allows the column selecting circuit 13 to select an image so that signals are read from pixel columns of x=4 to 6. That is, the timing generating circuit 11 is adapted to generate a control signal for selection by the row and column selecting circuits 12 and 13 based on an output from the image data arithmetic section 10.

Figure 3:
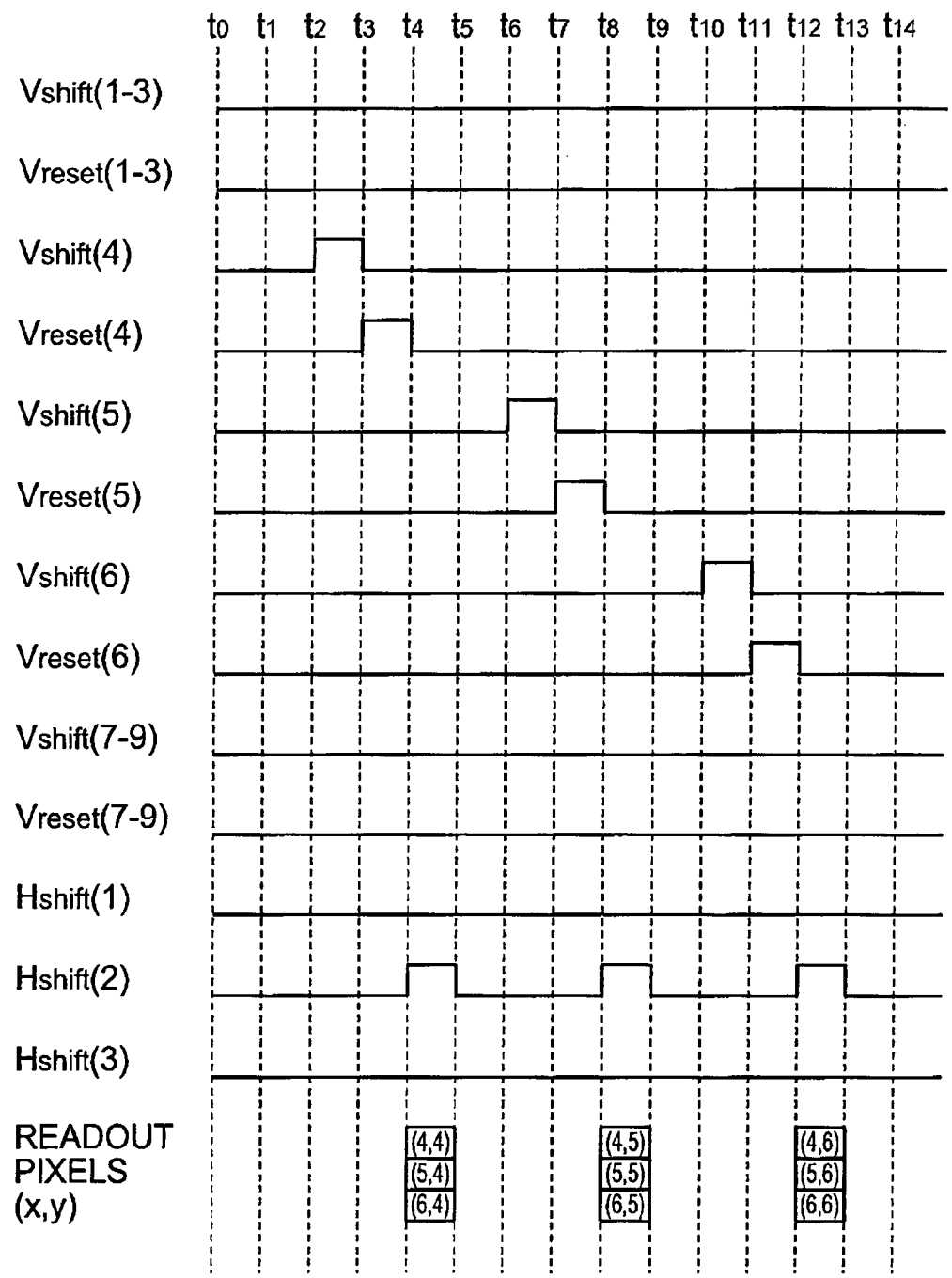
FIG. 3 is a timing chart for the solid-state imaging device shown in FIG. 1.

FIG. 3 is a timing chart for the solid-state imaging device shown in FIG. 1.

This drawing shows an example of reading signals from the partial readout area R shown in FIG. 1.

During the time between $t_0$ and $t_2$, the first to third shift signals (vertical) $V_{shift}$ (1 to 3), first to third reset signals (vertical) $V_{reset}$ (1 to 3), fourth shift signal (vertical) $V_{shift}$ (4), fourth reset signal (vertical) $V_{reset}$ (4), fifth shift signal (vertical) $V_{shift}$ (5), fifth reset signal (vertical) $V_{reset}$ (5), sixth shift signal (vertical) $V_{shift}$ (6), sixth reset signal (vertical) $V_{reset}$ (6), seventh to ninth shift signals (vertical) $V_{shift}$ (7 to 9), seventh to ninth reset signals (vertical) $V_{reset}$ (7 to 9), first shift signal (horizontal) $H_{shift}$ (1), second shift signal (horizontal) $H_{shift}$ (2), and third shift signal (horizontal) $H_{shift}$ (3) are all at a low level. It is noted that the number in each signal name indicates the address of each coordinate point "x" or "y". Also, FIG. 2 will be referenced appropriately in the following descriptions.

During the time between $t_2$ and $t_3$, since a high-level fourth shift signal (vertical) $V_{shift}$ (4) is input from the row selecting circuit 12, the address switches $Q_{address}$ (x, 4) in the fourth pixel row from the bottom in FIG. 1 are turned on, and the charges accumulated due to light incident to the photodiodes PD (x, 4) are amplified in the amplifiers AMP (x, 4) to be output to the video line $L_n$ as a voltage value and then held in the holding circuits H (1) to H (9). It is noted that each holding circuit is connected to a current source in parallel. Next, during the time between $t_3$ and $t_4$, since a high-level fourth reset signal $V_{reset}$ (4) is input, the reset switches $Q_{reset}$ (x, 4) are turned on, and the charges accumulated in the photodiodes PD (x, 4) are reset. During the time between $t_4$ and $t_5$, since a high-level second shift signal (horizontal) $H_{shift}$ (2) is input from the column selecting circuit 13 simultaneously to the switches Q (4), Q (5), and Q (6) in the respective fourth, fifth, and sixth pixel columns, the charges for the pixels P (4, 4), P (5, 4), and P (6, 4) accumulated in the holding circuits H (4), H (5), and H (6) are input to the respective processing circuits PU1, PU2, and PU3.

During the time between $t_6$ and $t_7$, since a high-level fifth shift signal (vertical) $V_{shift}$ (5) is input from the row selecting circuit 12, the address switches $Q_{address}$ (x, 5) in the fifth pixel row from the bottom in FIG. 1 are turned on, and the charges accumulated due to light incident to the photodiodes PD (x, 5) are amplified in the amplifiers AMP (x, 5) to be output to the video line $L_n$ as a voltage value and then held in the holding circuits H (1) to H (9). Next, during the time between $t_7$ and $t_8$, since a high-level fifth reset signal $V_{reset}$ (5) is input, the reset switches $Q_{reset}$ (x, 5) are turned on, and the charges accumulated in the photodiodes PD (x, 5) are reset. During the time between $t_8$ and $t_9$, since a high-level second shift signal (horizontal) $H_{shift}$ (2) is input from the column selecting circuit 13 simultaneously to the switches Q (4), Q (5), and Q (6) in the respective fourth, fifth, and sixth pixel columns, the charges for the pixels P (4, 5), P (5, 5), and P (6, 5) accumulated in the holding circuits H (4), H (5), and H (6) are input to the respective processing circuits PU1, PU2, and PU3.

During the time between $t_{10}$ and $t_{11}$, since a high-level sixth shift signal (vertical) $V_{shift}$ (6) is input from the row selecting circuit 12, the address switches $Q_{address}$ (x, 6) in the sixth pixel row from the bottom in FIG. 1 are turned on, and the charges accumulated due to light incident to the photodiodes PD (x, 6) are amplified in the amplifiers AMP (x, 6) to be output to the video line $L_n$ as a voltage value and then held in the holding circuits H (1) to H (9). Next, during the time between $t_{11}$ and $t_{12}$, since a high-level sixth reset signal $V_{reset}$ (6) is input, the reset switches $Q_{reset}$ (x, 6) are turned on, and the charges accumulated in the photodiodes PD (x, 6) are reset. During the time between $t_{12}$ and $t_{13}$, since a high-level second shift signal (horizontal) $H_{shift}$ (2) is input from the column selecting circuit 13 simultaneously to the switches Q (4), Q (5), and Q (6) in the respective fourth, fifth, and sixth pixel columns, the charges for the pixels P (4, 6), P (5, 6), and P (6, 6) accumulated in the holding circuits H (4), H (5), and H (6) are input to the respective processing circuits PU1, PU2, and PU3.

As mentioned above, the solid-state imaging device includes N processing circuits PU1, PU2, and PU3 connected to the respective N pixel columns via the switches Q (4), Q (5), and Q (6) that are turned on through the selection by the column selecting circuit 13. The n-th processing circuit PU1 (PU2, PU3) can be connected to the n-th pixel columns N1 (N2, N3) in the respective imaging blocks B1, B2, and B3 via the switches Q (1) to Q (9). Also, the N processing circuits PU1, PU2, and PU3 are adapted to generate a digital video signal from a signal for each pixel column selected by the row and column selecting circuits 12 and 13.

In accordance with the above-described solid-state imaging device, since the n-th processing circuit (e.g. PU1) can be connected to the n-th pixel columns (N1) in the respective imaging blocks B1, B2, and B3 via the switches Q (1), Q (4), and Q (7), signals from the adjacent pixel columns (N2) are to be processed separately by another processing circuit (PU2) even when the partial readout area R may be small. In addition, the image data arithmetic section 10 specifies the partial readout area R restrictively, which allows for higher speed imaging.

Further, the above-described solid-state imaging device includes multiple holding circuits H (1) to H (9) connected to the respective pixel columns N1, N2, and N3, in which the switches Q (1) to Q (9) are adapted to connect charges accumulated in the holding circuits H (1) to H (9) for each pixel column to the processing circuits PU1, PU2, and PU3 corresponding to the respective pixel columns N1, N2, and N3 synchronously with the control signal input from the timing generating circuit 11 to the column selecting circuit 13. The signals for each pixel row are once accumulated in the respective holding circuits H (1) to H (9), and when the switches Q (1) to Q (9) are turned on by the control signal, charges accumulated for each pixel row can be transferred to the processing circuits PU1, PU2, and PU3 corresponding to the respective pixel columns N1, N2, and N3.

Figure 4:
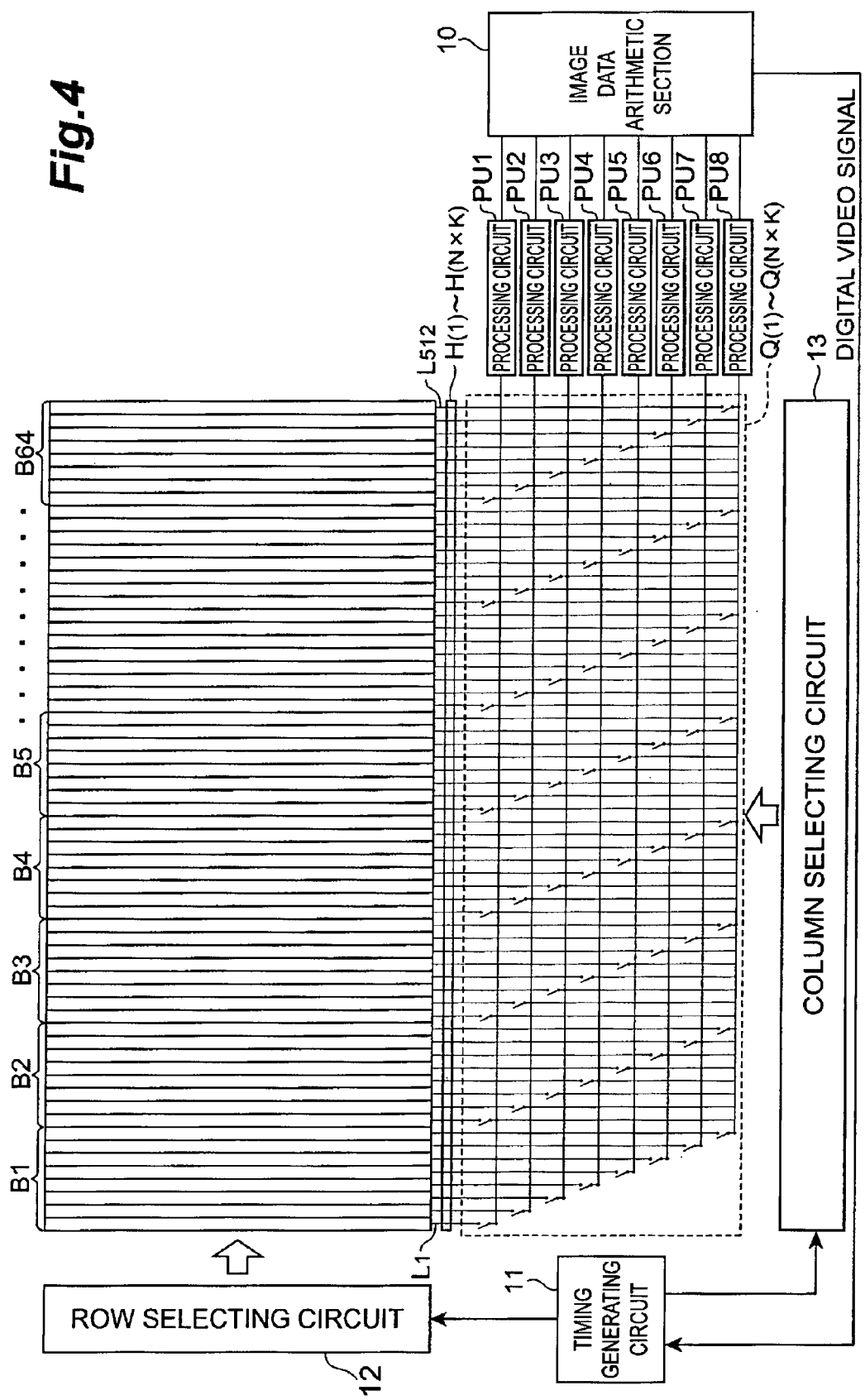
FIG. 4 is a circuit diagram of the solid-state imaging device according to the embodiment.

FIG. 4 shows a solid-state imaging device having 64 imaging blocks Bk (k=1 to 64), each imaging block including 8 pixel columns (K=64 and N=8), that is, having 512 vertical pixels and 512 horizontal pixels. It is noted that the n-th processing circuit PUn can be connected to the n-th pixel columns in the respective imaging blocks B1, B2, . . . , and B64 (n=1 to 8). A group of holding circuits H (1) to H (N×K) are provided between a group of switches Q (1) to Q (N×K) to be controlled by the column selecting circuit 13 and the imaging area. The group of switches Q (1) to Q (N×K) and the group of holding circuits H (1) to H (N×K) correspond, respectively, to the foregoing group of switches Q (1) to Q (9) and group of holding circuits H (1) to H (9). The operation of partial readout in this solid-state imaging device will hereinafter be described. Partial readout for the central 492×492 pixels is here selected by excluding peripheral 10 rows and 10 columns among the 512×512 pixels of an image that is obtained previously based on an output from the image data arithmetic section, and the timing generating circuit supplies a control signal required therefor to the row and column selecting circuits 12 and 13.

Figure 5:
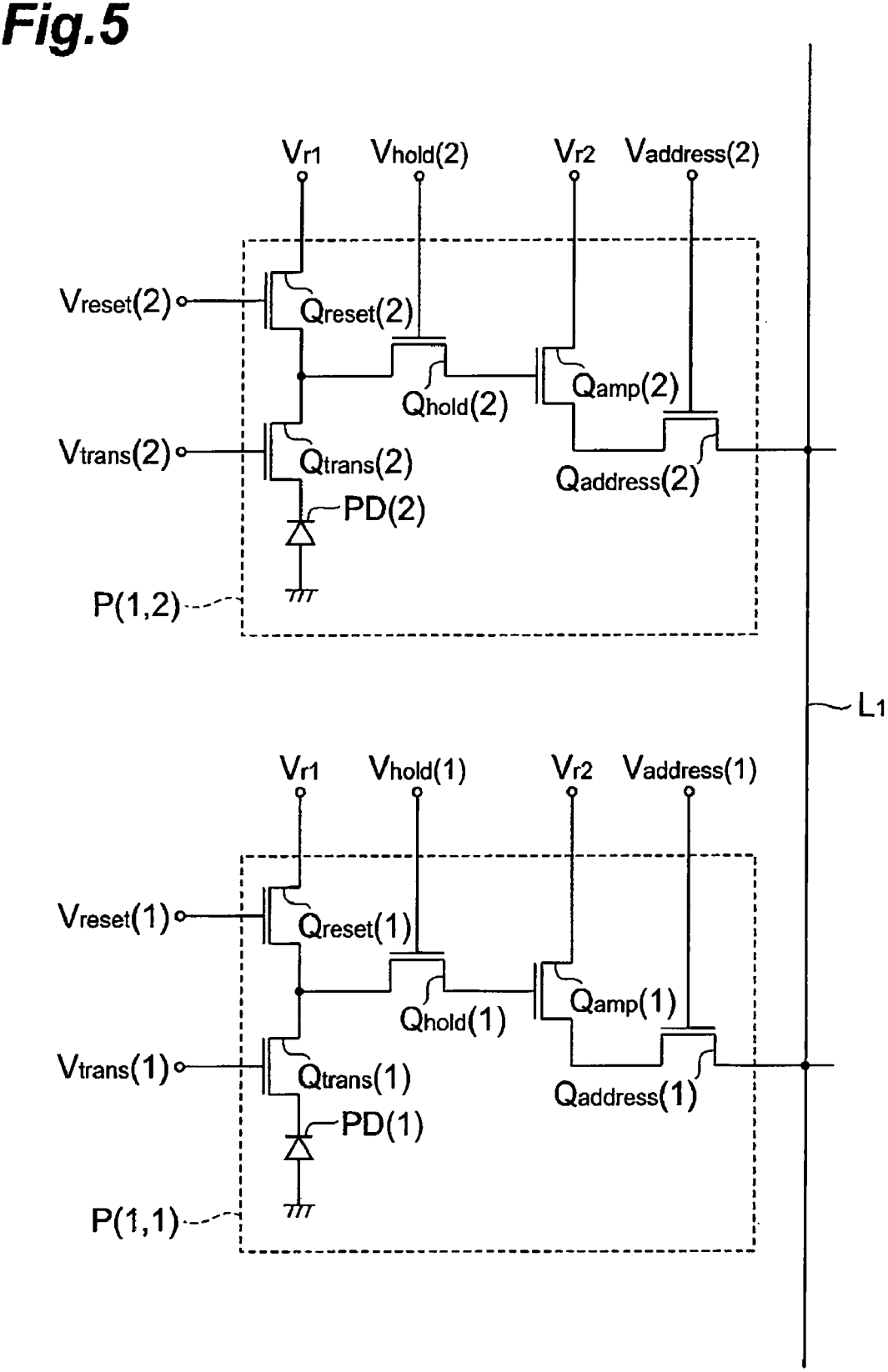
FIG. 5 is a detailed circuit diagram of each pixel P (x, y)

FIG. 5 is a detailed circuit diagram of each pixel P (x, y).

It is noted that switches are field-effect transistors in the following descriptions.

The pixel P (1, 1) includes a transfer switch $Q_{trans}$ (1) and a reset switch $Q_{reset}$ (1) provided in series between the cathode of a photodiode PD (1) and a reset potential $V_{r1}$. The upstream end of the transfer switch $Q_{trans}$ (1) is input to the gate of an amplifying transistor $Q_{amp}$ (1) via a hold switch $Q_{hold}$ (1). An address switch $Q_{address}$ (1) is provided between the amplifying transistor $Q_{amp}$ (1) and a video line $L_1$.

A transfer signal $V_{trans}$ (1) is input to the gate of the transfer switch $Q_{trans}$ (1), while a reset signal $V_{reset}$ (1) is input to the gate of the reset switch $Q_{reset}$ (1). Also, a hold signal $V_{hold}$ (1) is input to the gate of the hold switch $Q_{hold}$ (1). An address signal $V_{address}$ (1) is input to the gate of the address switch $Q_{address}$ (1). It is noted that the address signal $V_{address}$ (1) can also be referred to as first shift signal (vertical) $V_{shift}$ (1).

The configuration of the pixel P (1, 2) is the same as that of the pixel P (1, 1), except that the number in each component name is simply replaced by "2".

Figure 6:
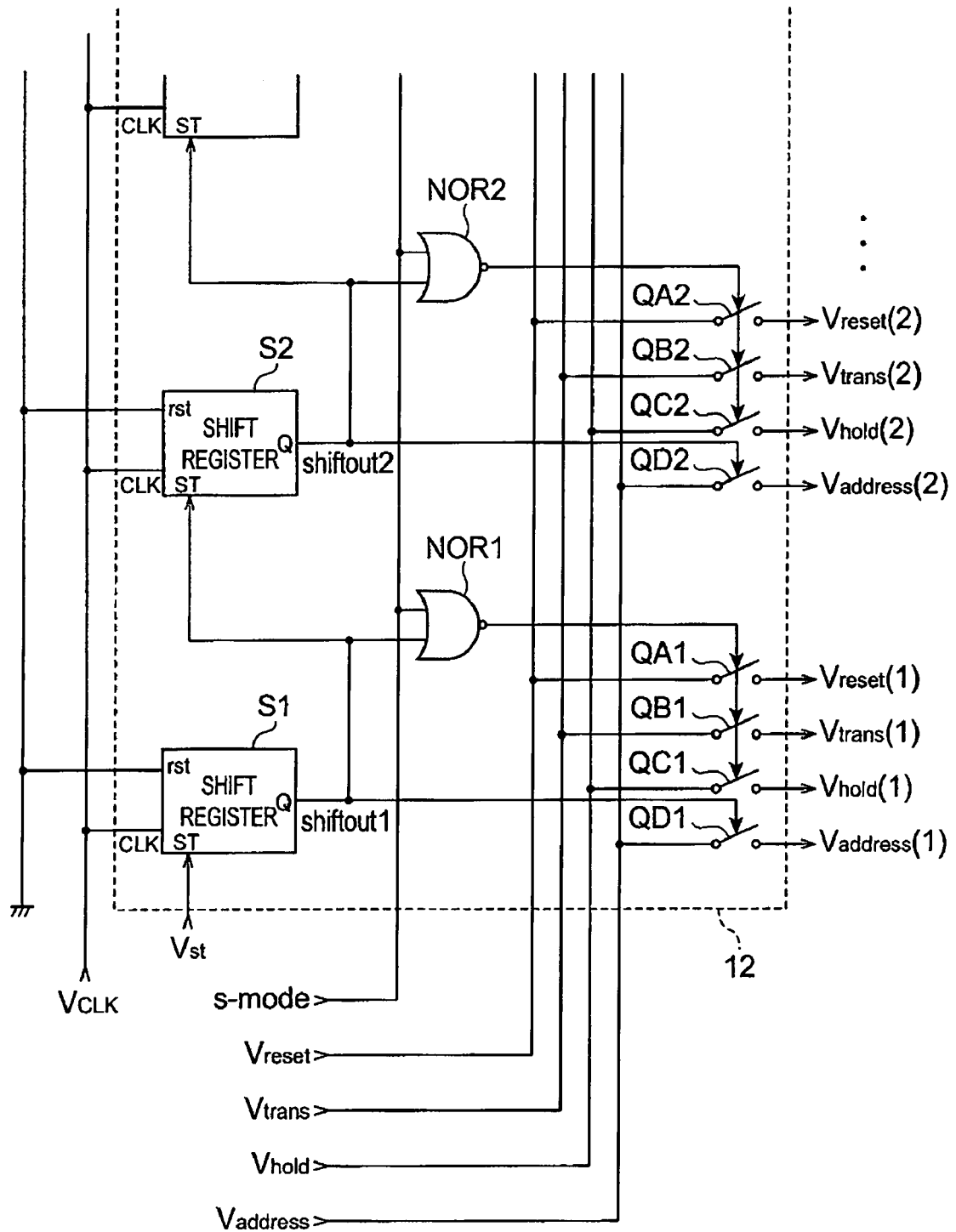
FIG. 6 is a circuit diagram of a row selecting circuit 12 for generating signals.
Figure 7:
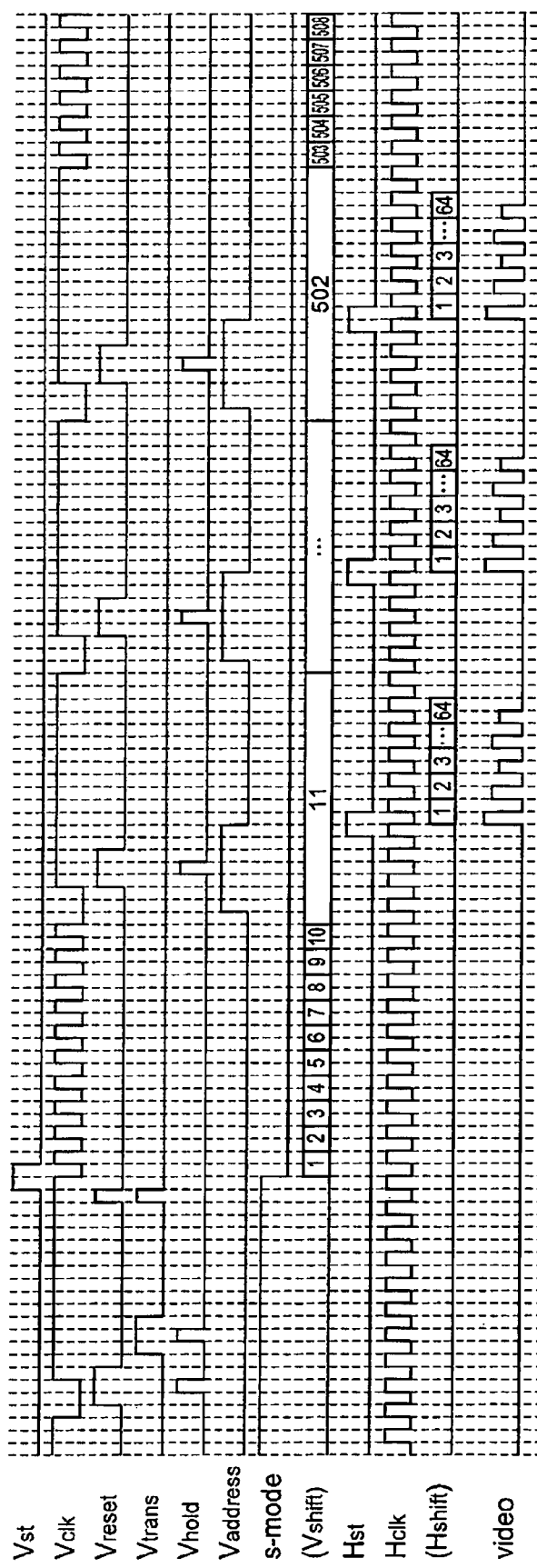
FIG. 7 is a timing chart of the signals.

FIG. 6 is a circuit diagram of a row selecting circuit 12 for generating signals. FIG. 7 is a timing chart of the signals. This drawing is for achieving partial readout for the central 492 rows excluding upper 10 and lower 10 rows in the vertical direction.

Shift registers S1, S2, . . . are provided for each row, each shift register including a set input terminal ST, a reset input terminal "rst", a clock input terminal CLK, and an output terminal Q. The reset input terminal is connected to a ground potential. A start signal $V_{st}$ is input to the set input terminal ST of the shift register S1, and an output "shiftout1" from the output terminal Q of the shift register S1 is input to the set input terminal ST of the shift register S2. In this manner, an output from the output terminal Q of each shift register is input sequentially to the set input terminal of the next shift register. When switches QA1, QB1, QC1, and QD1 are turned on at a predetermined timing in reading the first pixel P (1, 1), $V_{reset}$, $V_{trans}$, $V_{hold}$, and $V_{address}$ generated in the timing generating circuit 11 are input to the respective switches as $V_{reset}$ (1), $V_{trans}$ (1), $V_{hold}$ (1), and $V_{address}$ (1). This predetermined timing depends on an s-mode signal and a start signal $V_{st}$ generated in the timing generating circuit 11, and the pixel readout shifts sequentially from the first to second row. It is noted that in FIG. 7, each number in ($V_{shift}$) indicates a pixel row under readout, while each number in ($H_{shift}$) indicates a pixel column under readout.

The s-mode signal is input to a NOR circuit (NOR1) together with an output when the start signal $V_{st}$ is input to the shift register S1. It is noted that in the case of reading the second row, these signals are input to a NOR circuit (NOR2).

This drawing shows an example of a global shutter mode in which charges accumulated in the photodiodes PD (x, y) of all the 512×512 pixels are held simultaneously, where the signals $V_{reset}$, $V_{trans}$, and $V_{hold}$ can be supplied concurrently to all the pixels by keeping the s-mode signal at a high level. This allows charges accumulated in the photodiodes PD (x, y) to be transferred and accumulated in the gates of the amplifying transistors $Q_{amp}$ (x, y) at the same timing for all the pixels.

The actual operation is as follows. The s-mode signal is kept at a high level so that the signals $V_{reset}$, $V_{trans}$, and $V_{hold}$ are input for all the rows. If all of the signals $V_{reset}$, $V_{trans}$, $V_{hold}$, and $V_{address}$ are at a low level, charges in the gates of the amplifying transistors are reset when $V_{reset}$ and $V_{hold}$ are made high. When $V_{hold}$ and $V_{reset}$ are made low and then $V_{trans}$ and $V_{hold}$ are made high, charges accumulated in the photodiodes PD (x, y) are transferred to the gates of the amplifying transistors. Then, when $V_{hold}$ and $V_{trans}$ are made low and then $V_{trans}$ and $V_{reset}$ are made high, charges accumulated in the photodiodes PD (x, y) are reset, and thereafter $V_{trans}$ and $V_{reset}$ are made low to start the next accumulation.

For all the pixels, charges accumulated in the photodiodes PD (x, y) are transferred and held in the gates of the amplifying transistors in each pixel by returning the s-mode signal to a low level, while the photodiodes start the next accumulation. This achieves a global shutter mode operation in which the accumulation starts and ends simultaneously for all the pixels. After this, charges held in the gates of the amplifying transistors are selected and read for the intended pixels.

A vertical clock signal $V_{clk}$ generated in the timing generating circuit 11 is input to the clock input terminals CLK of the shift registers S1, S2, . . . . When an output from the output terminal Q of each shift register is input sequentially to the set input terminal of the next shift register such that a start signal $V_{st}$ is input to the set input terminal of the shift register S1, and an output "shiftout1" from the output terminal Q of the shift register S1 is input to the set input terminal of the shift register S2, charges accumulated in the pixels in each row start to be read. Here, if $V_{address}$ is at a low level and the vertical clock signal $V_{clk}$ has a short period, the first 10 rows are skipped.

Subsequently, a voltage obtained by returning $V_{address}$ to a high level from the pixels in the 11th row to amplify the accumulated charges is once transferred to the holding circuit, and then $V_{reset}$ and $V_{hold}$ are also made high to reset the charges in the gates of the amplifying transistors. Then, $V_{hold}$ and $V_{reset}$ are made low and the voltage after the reset is also transferred to the holding circuit, whereby two kinds of voltages, that is, the voltage obtained by amplifying the accumulated charges and the voltage output from the amplifying transistors when the charges in the gates of the amplifying transistors are reset, are input to the holding circuit. The holding circuit calculates and holds the difference between the two kinds of voltages using a CDS circuit for cancelling and reducing noise components. When the period of the vertical clock signal $V_{clk}$ is increased to accumulate charges for 512 pixels in the holding circuits, and then a pixel column readout start signal $H_{st}$ generated in the timing generating circuit 11 is input to the column selecting circuit 13, charges for the pixels corresponding to the selected partial readout area R among the charges for 512 pixels accumulated in the holding circuits are read through the 8 processing circuits to be input to the image data arithmetic section synchronously with a horizontal clock signal $H_{clk}$ generated in the timing generating circuit 11. This operation will hereinafter be described with reference to FIGS. 8, 9, and 10. It is noted that the last 10 rows from the 503rd pixel row are skipped similarly by reducing the period of the vertical clock signal $V_{clk}$.

That is, the readout time for unnecessary pixel rows is shortened by reducing the period of the vertical clock signal, and no address signal $V_{address}$ is input, that is, no video signal is output during the readout time for unnecessary pixel rows.

Figure 8:
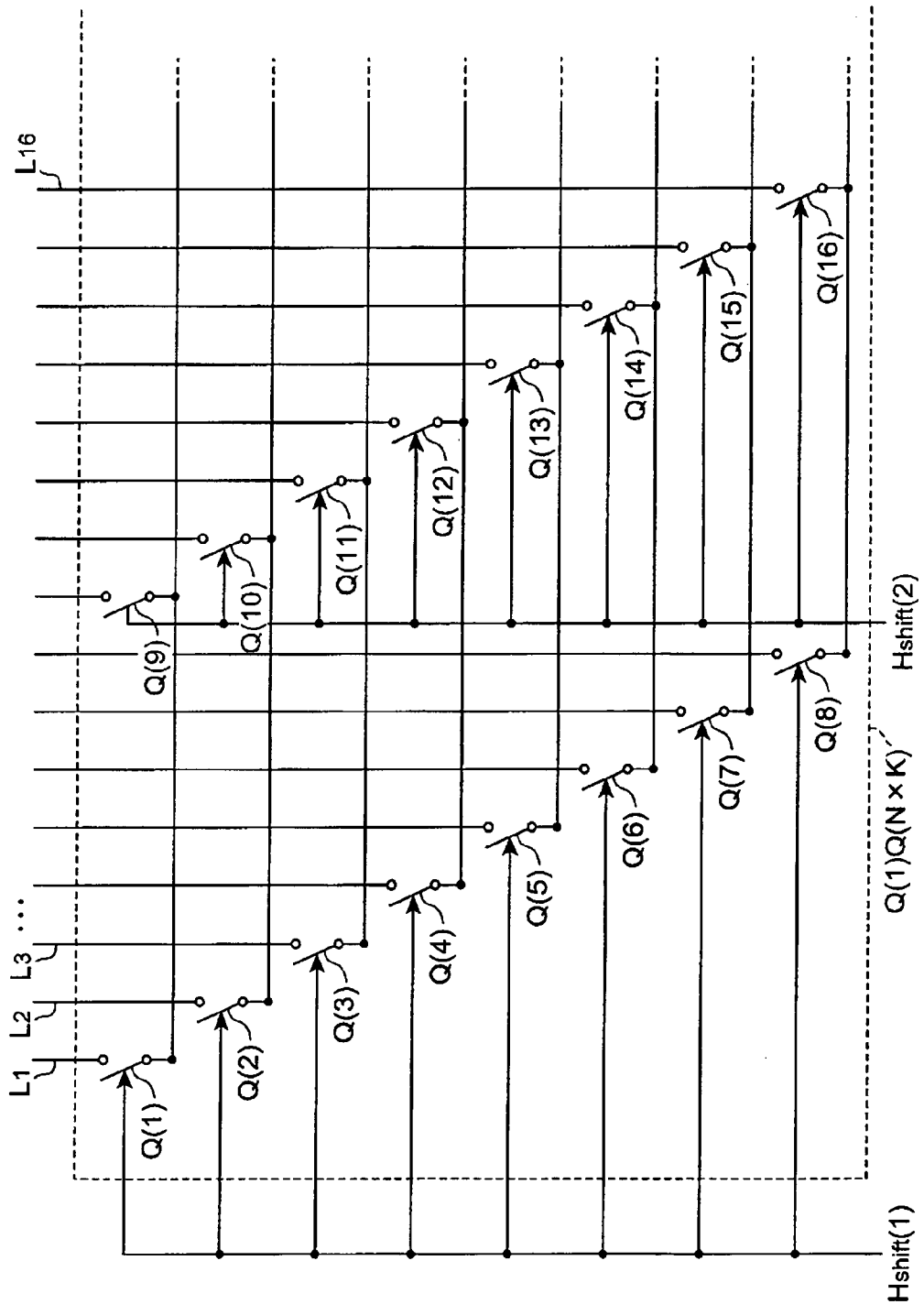
FIG. 8 is a circuit diagram of a group of switches Q (1) to Q (N×K) for reading charges accumulated in a group of holding circuits H (1) to H (N×K)

FIG. 8 is a circuit diagram of a group of switches Q (1) to Q (N×K) for reading charges accumulated in a group of holding circuits H (1) to H (N×K). The switches Q (1), Q (2), Q (3), . . . , and Q (N×K) are connected to the respective video lines $L_1$, $L_2$, $L_3$, . . . , and $L_{N \times K}$. A signal $H_{shift}$ is input to a group of switches in one imaging block, and when the signal $H_{shift}$ is at a high level, charges accumulated in the holding circuits are read.

Figure 9:
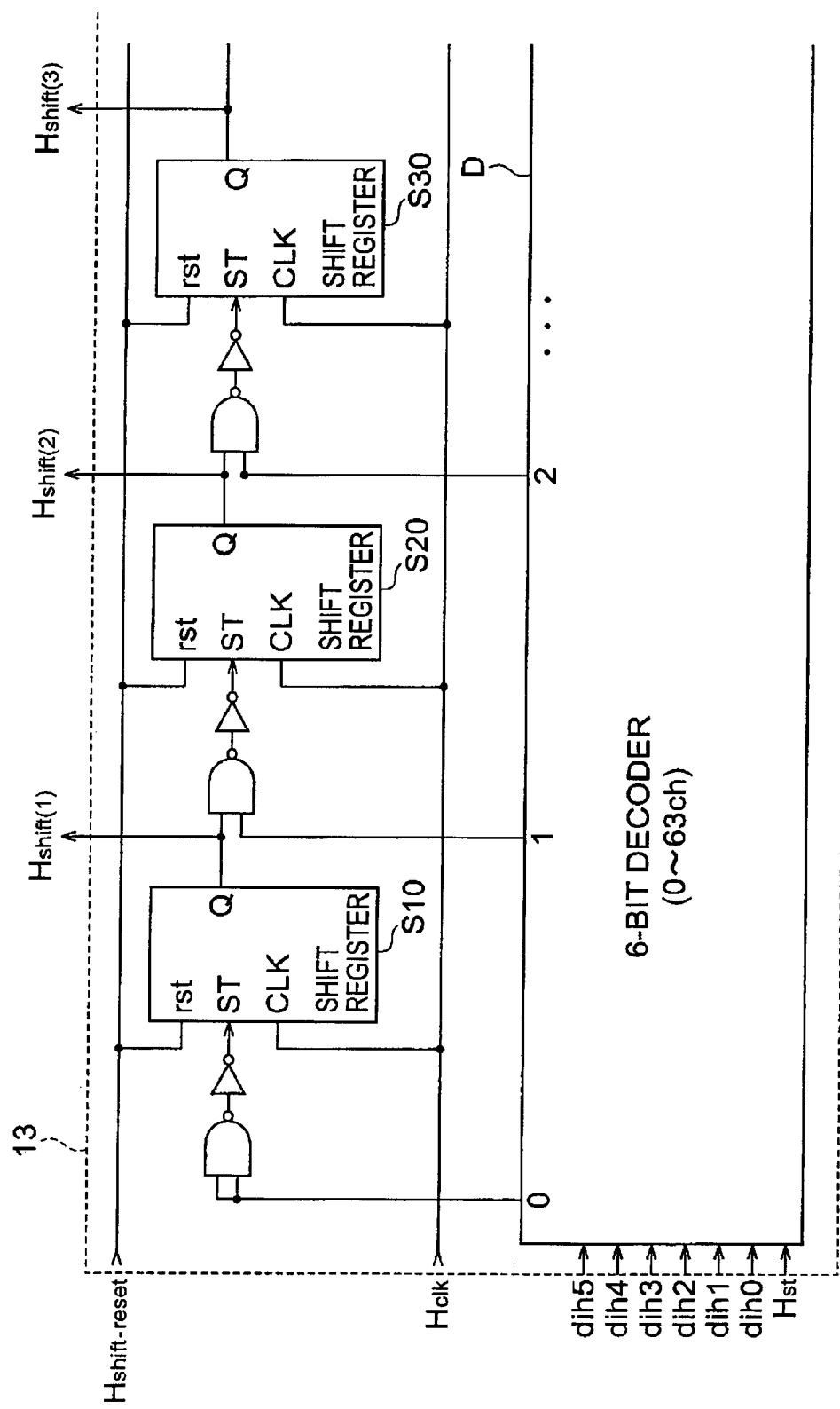
FIG. 9 is a circuit diagram of a column selecting circuit 13 for generating signals.
Figure 10:
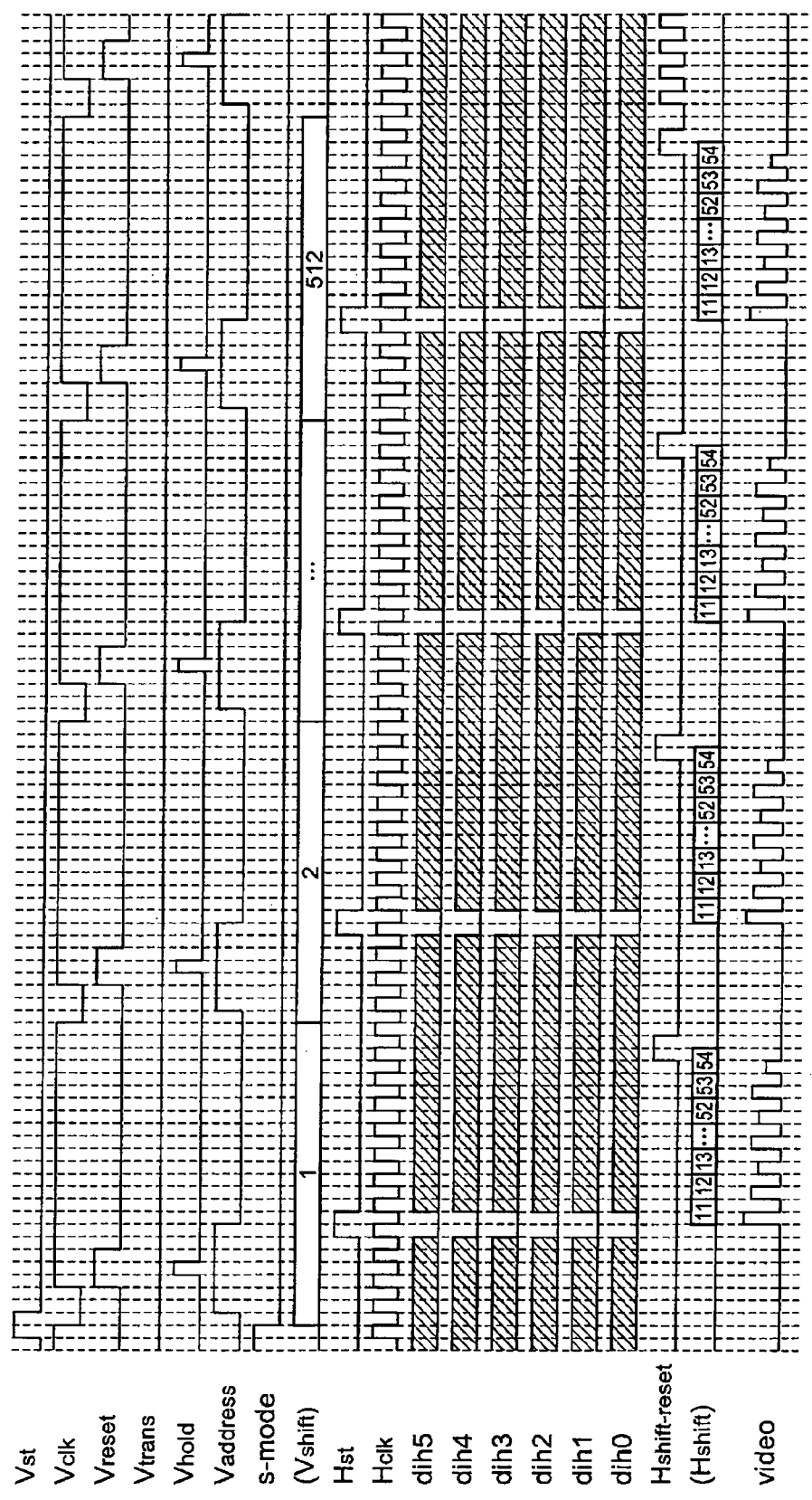
FIG. 10 is a timing chart of the signals.

FIG. 9 is a circuit diagram of a column selecting circuit 13 for generating signals. FIG. 10 is a timing chart of the signals. This drawing is for achieving partial readout for the central 492 columns excluding left 10 and right 10 columns in the horizontal direction. This drawing shows only a timing where the s-mode signal in FIG. 7 is made low and then the horizontal start signal $H_{st}$ is made high, and thereafter horizontal readout is performed.

Shift registers S10, S20, S30, . . . are provided for each imaging block, each shift register including a set input terminal ST, a reset input terminal "rst", a clock input terminal CLK, and an output terminal Q. A horizontal clock signal $H_{clk}$ is input to the clock input terminals CLK.

A start signal $H_{st}$ for horizontal readout is generated in the timing generating circuit correspondingly to a pixel of a desired readout start number among the 64 imaging blocks and then is input to a 6-bit decoder (0 to 63ch) D. The decoder D includes binary input terminals dih0, dih1, dih2, dih3, dih4, and dih5. NAND and NOT circuits are provided between the decoder output terminals 1, 2, 3, . . . and each set input terminal ST.

The decoder D is adapted to generate a high-level signal $H_{shift}$ to be input to a desired imaging block based on $H_{st}$ and binary inputs generated in the timing generating circuit 11. Signals for each pixel column in a specified imaging block are read based on the start signal $H_{st}$ and imaging block specifying signals dih0, dih1, dih2, dih3, dih4, and dih5. A signal $H_{shift}$ (1) generated correspondingly to the decoder output terminal 0 turns the switches Q (1) to Q (8) on when made high, while a signal $H_{shift}$ (2) generated correspondingly to the decoder output terminal 1 turns the switches Q (9) to Q (16) on when made high.

An all-reset signal $H_{shift\text{-}reset}$ generated in the timing generating circuit 11 can be input to the reset terminals "rst" of the respective shift registers S10, S20, S30, . . . . Higher speed partial readout is achieved by terminating the readout of charges accumulated in the holding circuits if $H_{shift\text{-}reset}$ is made high. It is therefore possible to achieve partial signal readout for the central 492×492 pixels excluding peripheral 10 rows and 10 columns among the 512×512 pixels by applying both of the methods shown in FIGS. 7 and 10.

It is noted that in the above-described example, the image data arithmetic section determines a partial readout area R based on the previous image and the timing generating circuit generates necessary control signals. However, the partial readout area R may be determined based on information that is obtained from the profile detecting function of the imaging device (referred to as "profile imager") disclosed in Japanese Patent Application No. 2003-189181 or may be determined based on images accumulated in the holding circuits and/or frame memories. Alternatively, the partial readout area R may not necessarily be determined based on accumulated images, and a signal for selection of reading only a part of all the pixels may be supplied externally instead of the image data arithmetic section. This allows the readout area and the number of pixels to be changed based on an externally input signal and thereby the number of pixels to be reduced. It is thus possible to achieve a solid-state imaging device applicable to various cases such as where higher speed imaging is required anyway and where reading only a part of the angle of view is required.

INDUSTRIAL APPLICABILITY

The present invention is applicable to solid-state imaging devices.

The invention claimed is:

1. A solid-state imaging device having an imaging area with K imaging blocks arranged therein, each imaging block including N pixel columns arranged adjacently, the device comprising:
    an image data arithmetic section for specifying a partial readout area in accordance with an input digital video signal;
    a row selecting circuit for selecting a pixel row corresponding to the partial readout area;
    a column selecting circuit for selecting a pixel column corresponding to the partial readout area;
    a timing generating circuit for generating a control signal for selection by the row and column selecting circuits based on an output from the image data arithmetic section; and
    N processing circuits connected to the respective N pixel columns via switches that are turned on through the selection by the column selecting circuit, wherein
    the n-th processing circuit can be connected to the n-th pixel columns in the respective imaging blocks via the switches, and
    the N processing circuits are adapted to generate the digital video signal from a signal for each pixel column selected by the row and column selecting circuits,
    wherein $N \geq 2$, and
    $K \geq 2$,
    the solid-state imaging device further comprising a plurality of holding circuits connected to the respective pixel columns, wherein
    the switches are adapted to connect charges accumulated in the holding circuits for the respective pixel columns to the processing circuits corresponding to the respective pixel columns synchronously with the control signal input from the timing generating circuit to the column selecting circuit.

2. The solid-state imaging device according to claim 1, wherein
    the processing circuits each have an amplifier and an analog-to-digital converter connected to each other.

* * * * *